May 31, 1960  D. ATLAS ET AL  2,939,129
ANALYSIS OF RADAR METEOROLOGICAL STATISTICAL DATA
Filed April 23, 1956  6 Sheets-Sheet 6

INVENTORS
DAVID ATLAS; LAWRENCE EISENBERG,
WALTER HITSCHFELD; JOHN S. MARSHALL
BY
ATTORNEYS

United States Patent Office 2,939,129
Patented May 31, 1960

2,939,129

ANALYSIS OF RADAR METEOROLOGICAL STATISTICAL DATA

David Atlas, Newton Center, Mass., Lawrence Eisenberg, New York, N.Y., and Walter Hitschfeld and John S. Marshall, Montreal, Quebec, Canada, assignors to the United States of America as represented by the Secretary of the Air Force Filed Apr. 23, 1956, Ser. No. 580,149

4 Claims. (Cl. 343—5)

This invention relates to the meterological analysis of storms, and particularly to the determination of the amount of rainfall that is to be expected from an observed storm or cloud mass.

The invention provides novel circuitry for converting the density characteristics of selected adjacent laminae of a cloud formation into a visible record (which may be a continuous graph or other suitable form), which circuitry utilizes echo pulses reflected from an electrical pulse train projected along a vertical plane intersecting the cloud mass. The echo pulses returning along said vertical plane are directed into the first of a series of pulse processing units which function to convert the pulse signals into a voltage pattern operative to produce a continuous record adapted to indicate, by reference to altitude and time-based coordinates, the successive reflectivity contours, and hence the progressively varying density, of the cloud mass as successive laminae of the cloud mass move across said vertical plane.

The present invention differs from that disclosed in Patent No. 2,656,531 (Reissue No. 24,084) issued to David Atlas, one of the applicants herein, in that the reflectivity contours are computed and plotted on the basis of an average of a series of independent echo pulses returned in sequence from scattered interception points, whereas the system of the prior patent operated in accordance with the instantaneous pulse amplitude of an echo pulse from a single interception point.

The novel circuitry herein disclosed also includes employment of a statistical averaging technique for determining cloud reflectivity, which technique involves the step of applying progressively graduated amplitude threshold "overshoots" of echo pulse energy, that is, the pulse peaks that extend beyond the appropriate individual amplitude levels, as progressively applied to said echo pulses.

The invention also employs energy storage and pulse counting circuitry wherein, first, there is stored upon the storage surface of an electron discharge tube (preferably of the "Radechon" category) a series of charges whose magnitude and spacing corresponds to the magnitude and sequence of the pulse overshoots above described, which overshoots are progressively fed into the electron storage circuitry of the system by way of detector and discriminator apparatus coupling the final I.-F. stage of the receiver circuitry to the said electron storage circuitry. This storage procedure is followed by a counting procedure wherein the stored charges are first "read" out of the storage unit, then applied to counting apparatus adapted to produce a counting voltage which, if coincident with one of the pre-selected group of standard voltage values, will actuate the graphic recording mechanism to impress a reflectivity measuring mark upon the recording chart, in a position thereon that will indicate the "contour," or reflectivity coefficient of the overlying cloud mass.

The invention further employs range compensation attenuation operative to insert, between the I.-F. preamplifier and I.-F. amplifier sections of the frequency-modulated receiver circuitry (or at any other convenient point) an attenuation loss proportional to 1/R (wherein the symbol R represents the altitude), thus eliminating altitude differences as a factor in a measurement of the reflectivity of the cloud mass whose density is to be determined. In this connection the invention also employs servo mechanism for adjusting the gain of the receiver circuitry to compensate for changes in transmitter power for overall radar sensitivity. Thus the invention incorporates procedures for compensation for variations in both target range and overall radar sensitivity with the combined effect of making the recorded density data a function only of the cloud density itself, independent of distance from the radar and of variations in the overall radar sensitivity.

The invention also embraces the herein disclosed means for putting into execution the novel methods of operation and procedural techniques above referred to, which methods and techniques are explained in detail in the following description of the invention as illustrated in the accompanying drawings, wherein.

As hereinabove indicated, the invention provides for determining storm cloud reflectivity by automatically computing the "overshoot" average of a series of echo pulse signals successively received within a very short time interval as, for example, one full second, or a fraction of a second. The echo pulse signals are subjected to computing circuitry which counts the number of times the amplitude of the returning cloud echoes exceeds the reference threshold level applied thereto, which reference threshold, for a given individual echo pulse, will be one of a series of thresholds of progressively differing amplitudes. It has been found that a satisfactory dynamic range—that is, a range of signal strength that will yield sufficient threshold overshoot power to insure production of a record having ninety-five percent accuracy—can be achieved by using two groups of thresholds, with two thresholds in each group.

Figure 6:
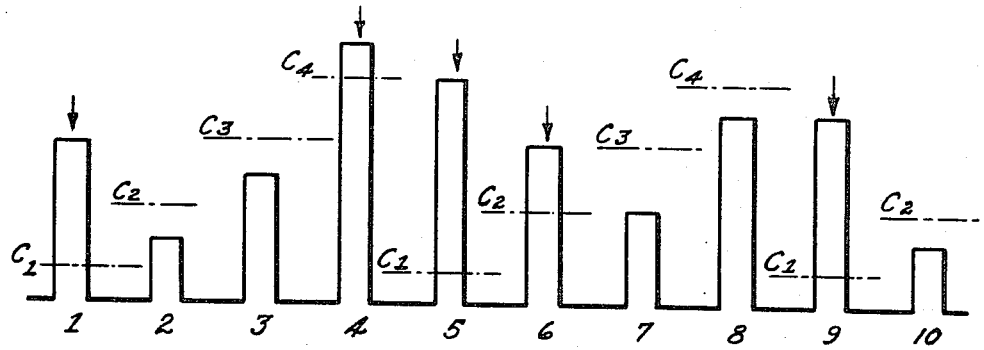
Figs. 6 to 9, inclusive, are diagrams illustrative of successive stages of transformation to which the echo pulse signals are subjected prior to conversion thereof into rain intensity intelligence plottable on a traveling record sheet.

Fig. 6 illustrates a pulse overshoot pattern that may result from use of a computing circuitry incorporating four voltage threshold levels, $C_1$, $C_2$, $C_3$ and $C_4$, and a pulse repetition of 400 pulses per second. In the course one full second, pulses in the sequence 1, 5, 9 . . . 397 will be seasured by threshold level $C_1$; pulses 2, 6, 10 . . . 398 by threshold level $C_2$; pulses 3, 7, 11 . . . 399 by level $C_3$; and pulses 4, 8, 12 . . . 400 by level $C_4$; and there will be a cumulative count of the number of times the applicable individual thresholds are exceeded or "overshot," by the amplitudes of the respective successively received pulses. In the example illustrated in Fig. 6, the ten pulses displayed would yield a count of 5, as only five of the pulses have amplitudes extending beyond their respective threshold levels. In other words, while the statistical potentiality is ten, the actual count for recording purposes, is only five. It can be shown that this actual count will not vary from a calcuable "statistical expectancy" by more than twenty percent.

The probability distribution of the successively received pulses, with respect to the successively operating threshold limitations, may be caucuated for the following equation:

$$P(E)dE = \frac{2E}{<E^2>}e^{-E^2/<E^2>}dE \tag{1}$$

wherein P represents the probability value, E the amplitudes of the pulses comprising the subject pulse train, and $e$ the logarithmic base value.

The probability of an amplitude overshoot, on the part of any given pulse, is calculable as follows:

$$p = e^{-C^2/<E^2>} \tag{2}$$

wherein $p$ represents the probability value, C the threshold voltage, and E and $e$ the values indicated above.

Let us now consider the echoes from four independent pulses, and let it be assumed that these pulse echoes are subjected to the limiting thresholds $C_1$, $C_2$, $C_3$, and $C_4$, respectively, as in Fig. 6. Now let P($p$) be the probability of exceeding the thresholds, $p=0, 1, 2, 3, 4$. The expectancy $<p>$ and variance $\sigma p^2$ are respectively $$<p> = \sum_{i=1}^{4} p_i \tag{3}$$

and $$\sigma p^2 = \sum_{i=1}^{4} p_i(1-P_i) \tag{4}$$

Now consider this pattern of 4 pulses repeated 100 times yielding $P_{\gamma i}(\gamma=1, 2 \ldots 100)$, threshold overshoots each time. Call $$X = \frac{\sum_{i=1}^{100} P_\gamma}{100}$$

The average number of overshoots. The range of X is 0 to 4 in steps of .01. We note by the Central Limit theorem that the probability distribution on X will be nearly normal with expectancy and variance $$<X> = <p> \tag{5}$$
$$\sigma X^2 = \sigma p^2/100 \tag{6}$$

The relative error in the value of $<E^2>$ deduced from the count X (for 68% confidence limits) can be shown to be $$\frac{<E^2>}{<E^2>} = \frac{\left\{\sum_{i=1}^{4} p_i(1-p_i)\right\}^{1/2} \times 100\%}{\frac{10 C^2}{<E^2>}\sum_{i=1}^{4} \alpha_i e^{-\alpha_i C^2 <E^2>}} \tag{7}$$

where threshold 1 is C and $10 \log \alpha_1 =$ the db separation between thresholds 1 and $i$ $$(i=2, 3, 4)$$

If thresholds with 10 db displacement are chosen and $C^2$ is chosen as 2 db above the lowest value $<E^2>_0$ to be determined, a dynamic range of approximately 40 db can be encompassed if errors less than 20% are tolerable.

In general, the use of more than one threshold provides the following advantages:

(a) Additional information may be obtained from pulses which are not statistically independent. For example, suppose the same in the illustration above is increased to 800 successive pulses where now pulse pairs (1, 2), (3, 4), (5, 6) . . . (799, 800) are statistically independent of one another but the components of each pair have total statistical dependence. Application of the original 400 pulses to a single threshold level would yield no less statistical information than the application of the 800 to the same threshold. But, if pulses 1, 3, 5 . . . 799 were applied to one threshold level and pulses 2, 4, 6 . . . 800 to another and a total count made of the excesses, the statistical information obtained would increase. Employing additional thresholds would further increase the statistical information on hand.

(b) If statistical error limits are set for specified confidence limits, the determinable dynamic range of average pulse amplitudes increases with the number of thresholds employed.

(c) As a consequence of items (a) and (b) above, the sampling time interval necessary to determine the statistical expectation of pulse amplitudes is reduced as the number of thresholds employed is increased.

Figure 7:
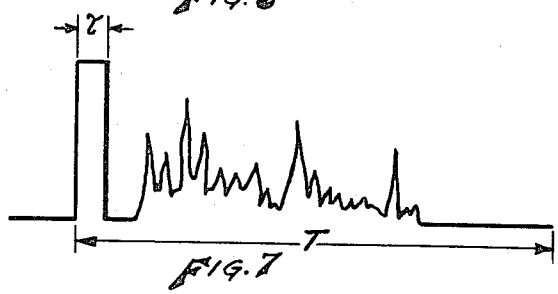

In particular, use of the above-described technique makes possible the determination of an altitude-time record of constant absolute reflectivity of clouds to radar signals at a given place. A single radar pulse directed vertically upwards at a cloud mass will return an echo reflection similar to the pattern represented in Fig. 7. The time interval T corresponds to the altitude interval R under consideration. If now we consider the echo amplitude (normalized with respect to range) at a given range element "k" we find that its statistical distribution is known. We can, therefore, determine the statistical expectation of the echo amplitude at range element "k" (and hence at any range element) by employing the indicated procedure.

Figure 1:
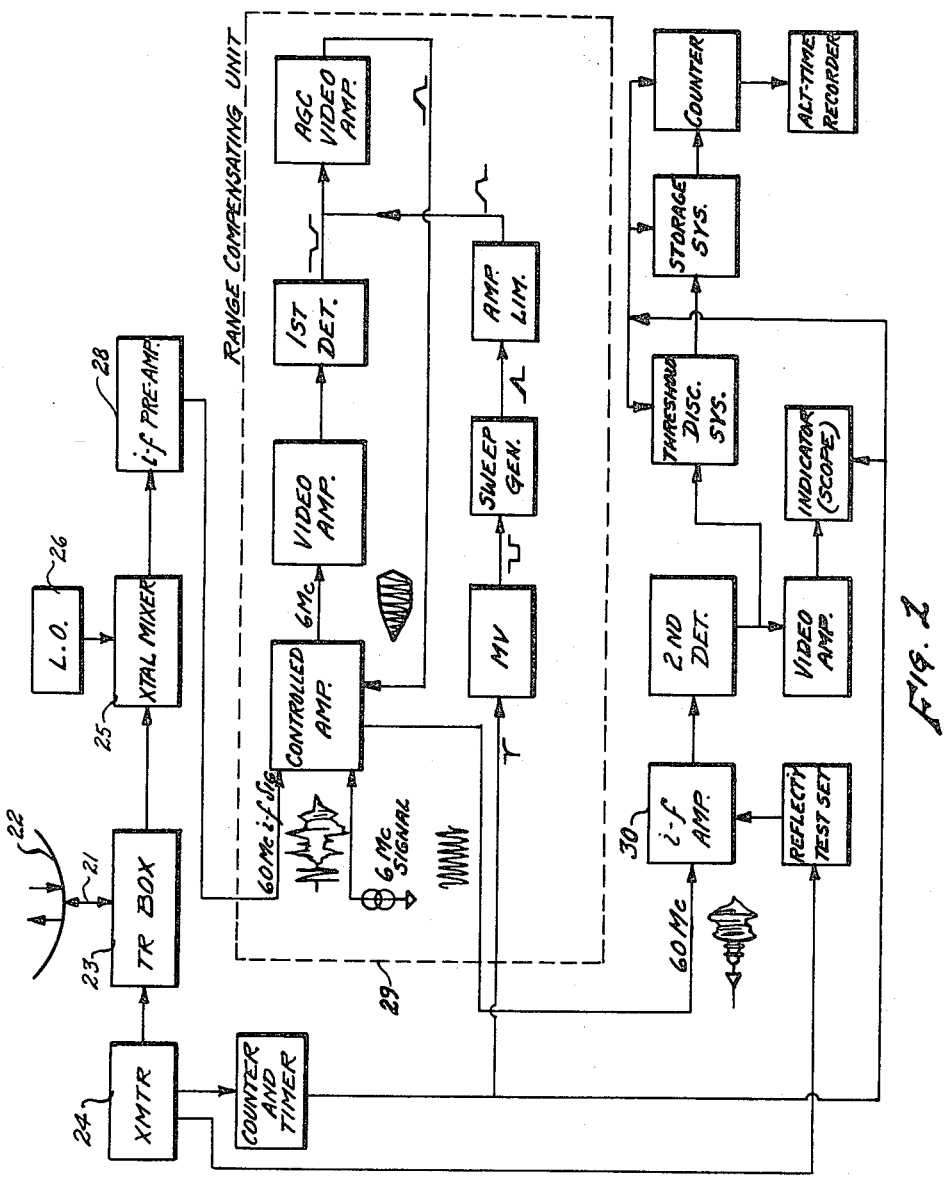
Fig. 1 is a block diagram of apparatus in which the invention may be embodied.
Figure 8:
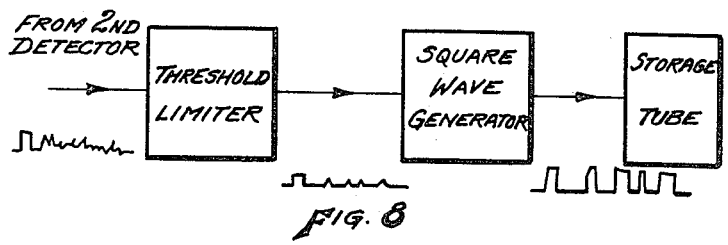
Figure 9:
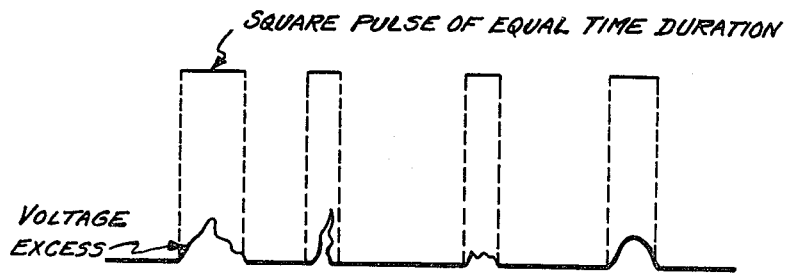

The block diagram of Fig. 8 illustrates the method. A series of, say, 400 radar pulses per second are directed vertically upward at a cloud mass. The output voltage at the radar second detector (see Fig. 1), corresponding to the echo amplitude for each pulse, is then applied to a limiting threshold circuit which passes only those voltages in excess of the threshold setting. If four thresholds are employed, then every fifth echo return is applied to the same threshold level. The square wave generator which follows shapes these voltage excesses into square pulses of equal time duration with the interval of excess voltage. (See Fig. 9.) These square pulses are used to gate the writing beam of a storage tube so that for each horizontal sweep (corresponding to a full altitude interval) dashes of charge are written in a horizontal line across the storage surface. As explained in greater detail hereinafter, the stored charge can be collected, or "read," by scanning the storage surface in a series of vertical sweeps, each of which counts the charge areas in a vertical line on the storage tube at each of the range intervals. In effect, what is being counted is the number of excesses at a given range interval. From statistical considerations, therefore, the expectation of the intensity of echo for the particular range interval is then known.

In applying the invention to the function of determining the reflectivity of a cloud formation directly above a fixed point of observation, the antenna feed 21 and parabolic reflector 22 (Fig. 1) serve as radiating and receiving means for the transmission of radiant energy, in pulse form, and the reception of so much of the pulse energy as is reflected back by the particle content of the overlying cloud bank; both the transmission and return reflection being in a vertical path. Transmit-receive box 23 serves alternately as a pulse transmitter and receiver in the manner that is conventional in the illustrated type of pulse signaling system. Transmitter 24 supplies the pulse energy to box 23 and the latter delivers the return echo pulses to the receiver circuitry including the mixer unit 25 which is subjected to the heterodyning action of the local oscillator 26, to produce the intermediate frequency signals for amplification in the I.-F. preamplifier 28.

The range compensating unit 29 hereinabove referred to is inserted between the I.-F. preamplifier 28 and the succeeding I.-F. amplifying stages 30. It has the function of inserting an attenuation loss proportional to 1/R in the I.-F. signal. The time interval during which the attenuation occurs depends on the selected range and, under the conditions herein assumed, would have a maximum duration of 60 microseconds.

Specifically, normalization for the range of the returning echoes may be assumed to be available in the following interval selections:

(a) 1,000 to 10,000 feet
(b) 1,000 to 20,000 feet
(c) 1,000 to 30,000 feet

Switch 45 (Fig. 2) is settable in any of three positions, a, b, and c, to select the desired range interval.

The range compensating unit 29 (Fig. 1) includes a controlled amplifier (Pentodes $V_1$—$V_2$— and $V_3$ of Fig. 2) having amplifying signals of sixty megacycles and six megacycles. The 60 mc., radar I.-F. signal is received at the control grid of tube $V_1$ by way of lead 31 (Fig. 2), into which is tapped a second lead 32 carrying the constant amplitude 6 mc. control signal, the latter being generated by a Hartley oscillator circuit including tube $V_{12}$ and coil 33. The output of the controlled amplifier is channeled into two circuits. The 60 mc. radar I.-F. signal is taken from the tube $V_3$ by way of output lead 34, is passed on to the main section of the radar I.-F. amplifier. The 6 mc. output, as directed from lead 34 to lead 35 (Fig. 2) is passed into a video amplifier, shown in Fig. 2 as constituted by pentodes $V_4$ and $V_5$.

Figure 2:
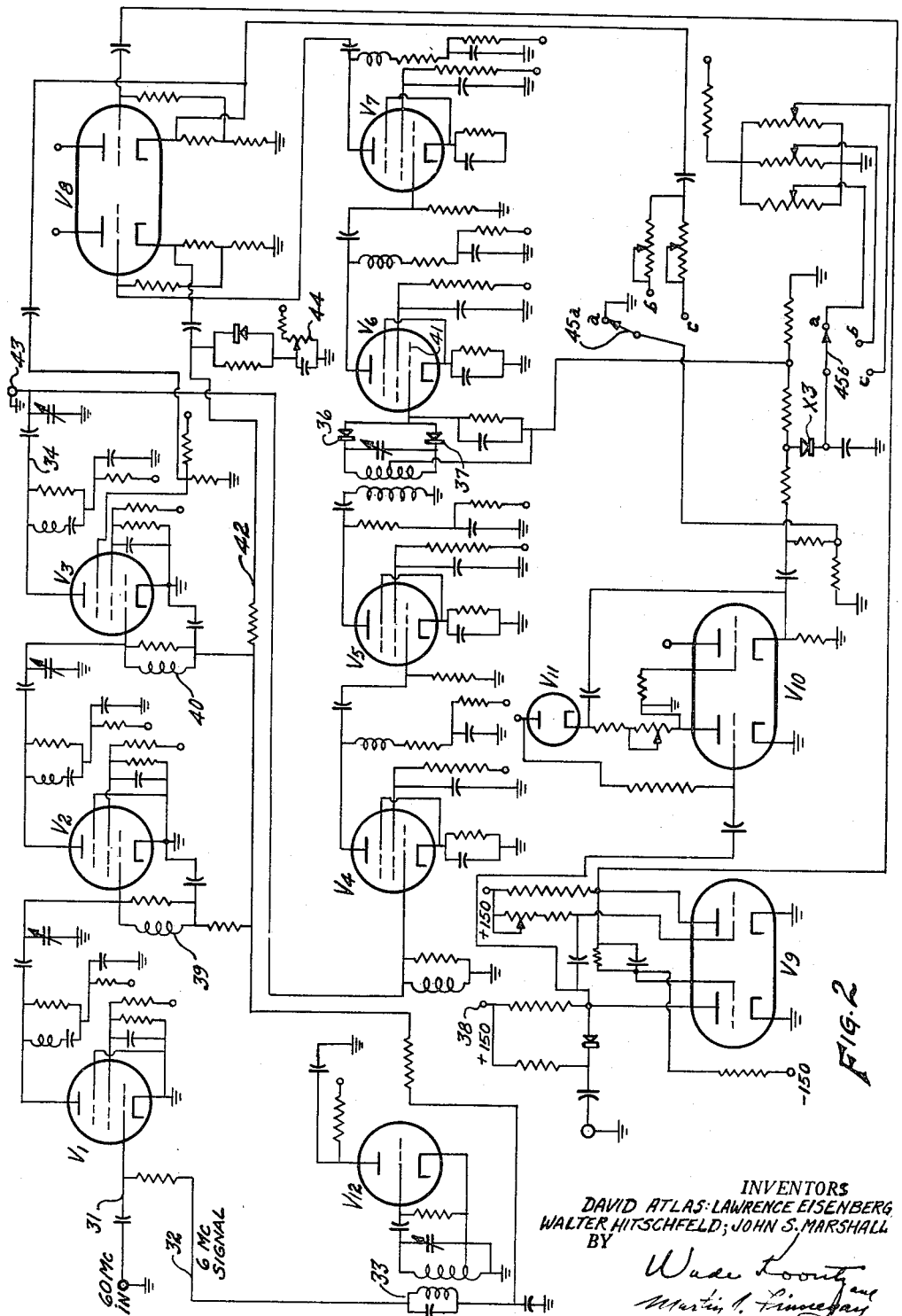
Fig. 2 is a diagram of electrical connections and components constituting the range compensation unit.

This video amplifier, after amplifying the 6 mc. control signal, yields an output which is rectified, as indicated at 36 and 37 in Fig. 2. The (negative) rectified output and a (positive) control wave of trapezoidal form are then combined at the input to the AGC amplifier as constituted by pentodes $V_6$ and $V_7$ (Fig. 2). The output of the AGC amplifier is returned to the grids of the controlled amplifier $V_1$—$V_2$—$V_3$ to increase the gain of this section with time, which conforms with the trapezoidal control wave.

The trapezoidal wave is linear with time for the first 60 ms., and flat for the next 60 ms., decaying to zero amplitude thereafter. This time variation is exactly the desired gain variation for the controlled amplifier. It is developed in the following manner:

The gain of the controlled amplifier is set so that it is well below 1/5000 at the time of the initiation of the transmitter pulse. This gain condition is calculated to keep the gain after 2 ms. (following the initiation of the transmitter pulse) within one percent of the required value.

Also, as heretofore noted, the controlled amplifier has three stages ($V_1$—$V_2$—$V_3$) as illustrated in Fig. 2. The coupling network employed has been chosen to give minimum time delay in the operation of the AGC system. The 30-microhenry chokes (39 and 40, Fig. 2) are inserted in the grid circuits of the stages $V_2$ and $V_3$, respectively, to attenuate the feeding of the AGC grid wave (which has a fundamental frequency of 800 cycles per second) through the controlled amplifier.

The cathodes of the three stages are grounded, with the grids returned through R.-C. filters to the desired bias setting, adjusted at resistor 44 (Fig. 2). The AGC waveform which will cause the gain of the controlled amplifier to vary linearly with time is superimposed upon this bias setting.

$V_4$ is a video amplifier shunt that is inductance-compensated for minimum time delay of the linearly modulated 6 mc. signal. The output of $V_5$ is tuned around a center of 6 mc., with a band width of four mc. The output of $V_5$ is rectified in a full wave detector (36, 37, Fig. 2) to produce primarily a 12 mc. ripple. The possibility of feeding back 6 mc. through the AGC amplifier is thus less likely.

This rectified voltage is applied as a negative voltage (to ground) to the grid 41 of $V_6$ where it is combined with the positive trapezoidal control wave, heretofore described.

The trapezoidal wave is generated for the ensuing reasons: (Selection 3 will be used for illustrative purposes). The desired variation in gain is a linear one for the time interval, zero ms. to sixty ms. At sixty ms., the gain has reached its maximum value of unity. At approximately 100 ms., the test pulse for the reflectivity test set is passed through the controlled amplifier to monitor the gain. At this time, the gain must be at the same level as it was at 60 ms. Hence, the necessity for trapezoidal wave form.

This wave form is generated as follows: a monostable multivibrator, $V_9$, is triggered by the 800 cycle transmitter pulse applied to input point 38. A negative rectangular pulse, 120 ms. in duration, is coupled to the Bootstrap sweep generator, $V_{10}$, which generates a linear sawtooth wave. The sawtooth is limited by the succeeding crystal limiting circuit X3 (Fig. 2) after a 60 ms. time interval has elapsed. As the trapesoidal wave form rises, the voltage at grid 41 of $V_6$ will become increasingly positive. This voltage, amplified by the two stages of video amplifier, $V_6$, $V_7$, and directed into the left half of cathode follower $V_8$ is fed back by way of lead 42, as instantaneous AGC to the grids of stages $V_1$, $V_2$, and $V_3$ of the controlled amplifier. The positive going grids result in increased gain of the controlled amplifier and, consequently, an increase in the negative rectified output of $V_5$ which will follow the trapezoidal control wave very closely. Since the amplitude of the 6 mc. signal is forced to vary linearly with time, solely by varying the $G_m$'s of the controlled amplifier stages, the same condition will obtain for the 60 mc. radar I.-F. signal, which is removed at the output jack 43 of $V_3$.

It may be noted that $V_3$ is a gated amplifier which is completely cut off during the interval when the trapezoidal control wave is not present. This prevents the possibility of low frequency regeneration due to the closed AGC loop. $V_3$ is gated by the same multivibrator, $V_9$, which initiates the sweep. The cathode follower, $V_8$, is inserted for isolation purposes.

Switch 45 (Fig. 2) is employed to select the normalizing range, as heretofore noted. This switch has two linked arms (designated 45a and 45b in Fig. 2) so that it simultaneously selects the appropriate limiting voltage for the trapezoidal control wave and the D.-C. shift in the level of the trapezoid. In employing selection steps (b) and (c), the trapezoidal wave is shifted in the positive direction. Thus, the initial gain of the controlled amplifier is raised as required.

The largest error of this unit, according to design calculations, will be on the order of five percent, and will occur at the 2 ms. interval, and become decreasingly smaller thereafter. The sources of this error (which is not of great importance) are as follows:

Time delay through the coupling networks of the amplifier circuitry.

Tendency of the control trapezoidal waveform to deviate, slightly, from linearity.

Frequency and amplitude changes in the output of the 6 mc. oscillator.

The major source of error lies in the time delay of the circuitry. At 2 ms., this will be of the order of five percent and diminish to approximately 0 percent at 60 ms. Deviations from linearity of the rising portion of the trapezoidal waveform will be less than ½ percent. Amplitude changes in the output of the 6 mc. oscillator 33 will be of the order of 1 percent.

The functions of the storage-time circuitry (Figs. 3 and 4) can be divieded into three major divisions: reading, writing, and timing. While "writing," the unit records on the storage surface of the Radechon tube ST (Figs. 3 and 4) information as to the number of times the returning radar echo signal exceeds the two threshold settings at each one of the assumed 240 range elements. While "reading," this information is recovered from the storage surface in the form of electrical pulses which are transmitted to the counting display unit (hereinafter described in detail). The "timing" circuitry includes synchronizing and trigger circuits which operate to insure that the "reading" and "writing" operations are carried out in proper sequence and for the correct time intervals.

Figure 3:
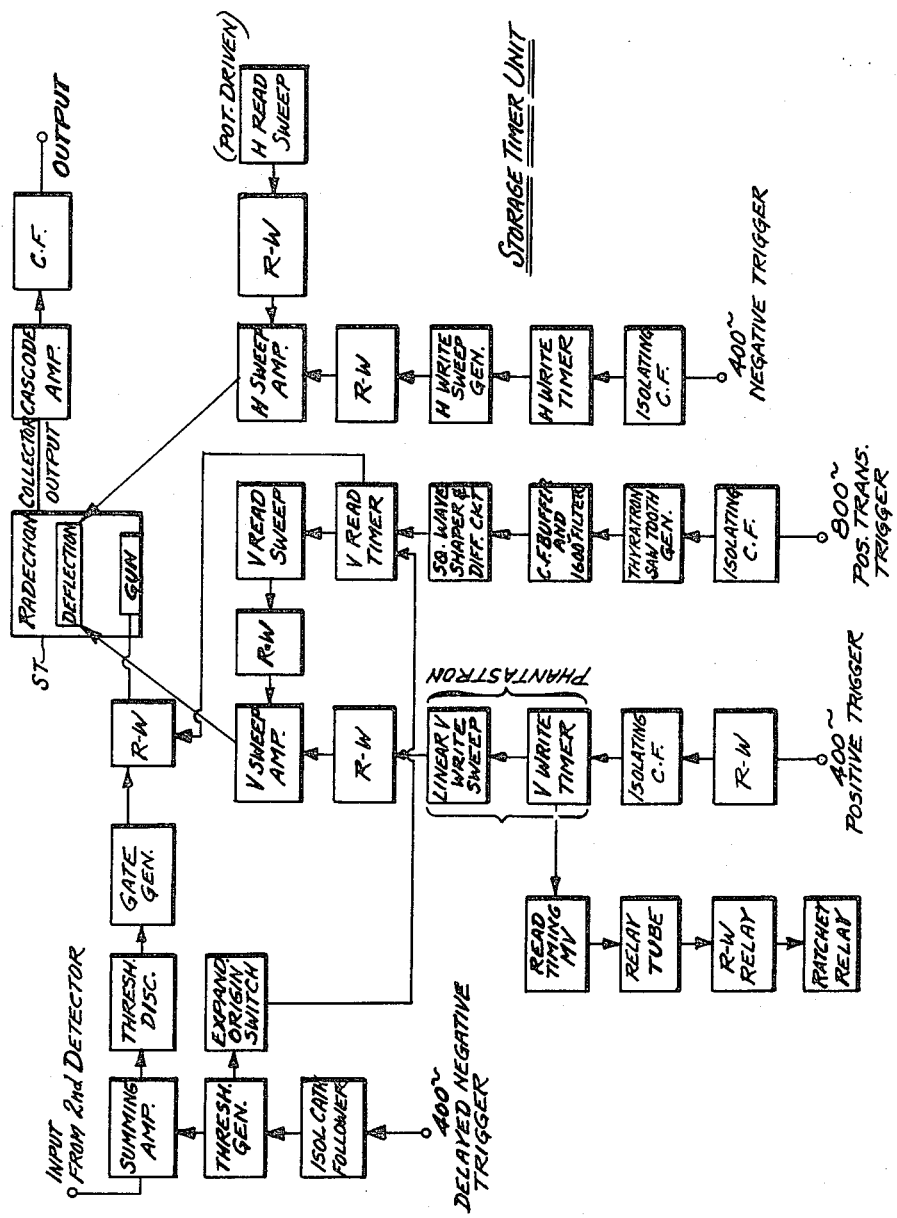
Fig. 3 is a block diagram of the storage section of the system.
Figure 4:
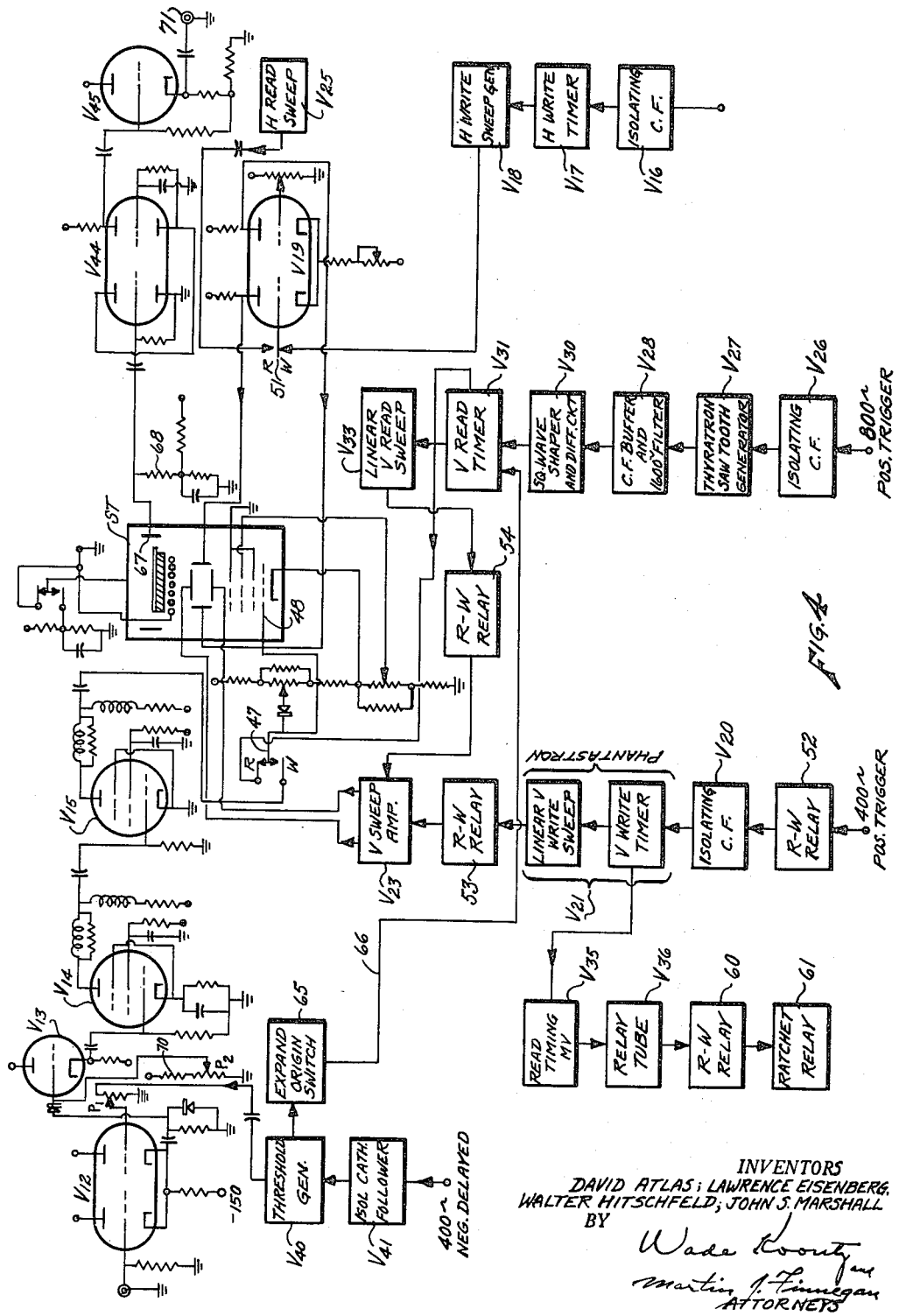
Fig. 4 is a diagram of the electrical connections for certain of the components indicated in block form in Fig. 3.

Fig. 3 is a block diagram (and Fig. 4 a more detailed diagram) of the storage-timer circuitry. The radar echo signal out of the second detector is coupled to one section of a summing amplifier $C_{12}$ (Fig. 4). The square wave output of the threshold generator $V_{40}$ (Fig. 4) is coupled to the other section of the summing amplifier $V_{12}$. The output of the amplifier is applied to the threshold discriminator $V_{13}$ (Fig. 4) so that only when the summed voltage is in excess of the threshold setting does any signal get through to the gate generator $V_{14}$—$V_{15}$ (Fig. 4). The output of the gate generator is applied to the Radechon control grid when the R—W (Read—Write) relay-operated switch 47 (Fig. 4) is in the W position.

The H write sweep occurs at a repetition rate of 400 cycles per second and has a 60 microsecond duration. It is initiated by a 400 cycle count down trigger (synchronized to the transmitter PRF), which in turn operates a monostable multivibrator timer, shown at $V_{17}$ in Fig. 4. The timer initiates and times a bootstrap sweep $V_{18}$ which is coupled to the Radechon tube ST through the push-pull horizontal sweep amplifier $V_{19}$ when the R—W relay 51 is in the W position.

The V write sweep is of ½ second duration. It is initiated by the first of the 400 cycle count-down triggers (when the R—W relay 52 is in the W position), which generates the linear sweep of a phantastron circuit, indicated at $V_{21}$ in Fig. 4. This sweep is coupled to the Radechon ST through the push-pull vertical sweep amplifier $V_{23}$ when the R—W relay 53 is in the W position.

The V read sweep is at 1600 cycles per second. Since the radar may be operated with a PRF of 800 cycles/sec., the following synchronizing technique is employed: A thyratron sawtooth generator $V_{27}$ (Fig. 4) is synchronized to the 800 cycle transmitter trigger (or count down 800 cycles from the 1600 cycles of the transmitter). The resulting sawtooth output is filtered in the output of a buffer cathode follower stage $V_{28}$ into a 1600 cycle square wave and differentiated. The differentiated output triggers the V read timer $V_{31}$ which initiates the V read sweep. The V read sweep is coupled to the Radechon ST through the push-pull V-sweep amplifier $V_{23}$ when the R—W relay switch 54 is in the R position.

The H read sweep (indicated at $V_{25}$ in Fig. 4) will be applied to the H push-pull sweep amplifier $V_{19}$ by way of the "R" contact of relay 51. A potentiometer geared to the time-controlled mechanism of recorder 35 (Fig. 1) will provide the voltage for excitation of the H read sweep generator $V_{25}$. The timer action will now be described: The phantastron $V_{21}$ which develops the vertical Write sweep also generates a timing rectangle which, after differentiation, triggers the read timing multivibrator $V_{35}$ (monostable) which then cuts off the relay tube $V_{31}$. Cut off of the relay tube $V_{36}$ switches the Read—Write relay 60 to R, which inserts the read sweep and operates the ratchet relay 61. The ratchet relay (which changes contact setting only when the relay tube is cut off) inserts (or removes) a step of attenuation and changes the noise correction and threshold discriminator settings. After a little more than ⅙ of a second, the read timing tube goes back to its stable state, and the relay tube $V_{36}$ is operated. Operation of the relay tube switches the R—W relay 60 back to W, which inserts the W sweeps and triggers the V timer with the next 400 cycle pulse and the writing sequence is repeated.

A range expansion means may be provided to enable the operator to expand any interval of five or ten thousand feet to the entire width of the recorder paper. In accomplishing this, the "expand origin" switch 65 (Fig. 4) selects the beginning of the interval to be examined and the range expansion switch chooses an interval of 5,000 to 10,000 feet. If 5,000 feet is in the interval chosen, a 200 cycle reading sweep is employed. This 200 cycle synchronizing trigger is obtained as follows:

The threshold generator $V_{40}$ (Fig. 4) is triggered as usual by the four hundred cycle trigger. With the range expansion switch (not shown) set at 5,000 feet, the output of the threshold generator $V_{40}$ is differentiated and applied to the V read timer $V_{31}$, by way of lead 66. The threshold generator is acting in effect as a count down circuit which divides the four hundred cycles by two in this case.

With the setting at 10,000 feet, a 400 cycle reading sweep is desired, which is synchronized from one of the isolating cathode followers whose input in a 400 cycle count-down trigger.

During the read interval, the storage surface will be discharged and a series of output pulses obtained for each range intervals. These pulses will be taken off the Radechon collector element 67 (Fig. 4) and coupled to a cascade amplifier $V_{44}$ to an output cathode follower stage $V_{45}$. This latter stage is coupled to the counting display unit by suitable cable, leading from terminal 71, Fig. 4.

*Counting display unit*

The counting display unit (Fig. 5) has the function of counting the pulses read off the Radechon storage surface during the read time interval. The number of pulses is totalled for each range interval and compared to one of four standard values. If the count is equal to one of the standard values, an output pulse is generated to trigger the recorder drive into burning a spot on the recorder paper at the proper range element.

During the read interval, as the vertical read sweep is traversing the storage surface of the Radechon, the resulting pulses are coupled to the counting display unit. These pulses are passed into a pulse amplifier, and then into a pulse shaper and differentiated. The differentiated pulse triggers a narrow pulse generator which generates a pulse approximately 1 ms. in time duration. This pulse is applied to the ringing circuit and a square pulse, 0.8 ms. in time duration, is generated. The amplitude of the pulse, which may be 150 volts, is applied to the counting circuit. The counting circuit integrates the series of pulses until the vertical read sweep has completed its traverse of the storage surface. The initiation of the vertical sweep flyback, triggers a gating and delay multivibrator which, after a 40 ms. delay, triggers a counter clearing MV. The latter, in turn, clears the counting circuit.

The output voltage of the counting circuit is applied to one section of each of four cathode followers. Each of the outputs of these cathode followers is combined with a noise correction voltage which subtracts the proper amount of counts due to the effects of receiver noise. The corrected count voltage is applied to four amplitude discriminator circuits (corresponding to four different contours) which are set to respond only to an exact count voltage (within tolerances). This count voltage will result in a triggering pulse to the recorder driver if two events take place simultaneously. First, the time interval involved must be during the unstable period of the gating and delay multi. Second, the count voltage must match one of the four standard values. If both of these conditions are simultaneously satisfied, then an output signal is passed on through to the gated amplifier which is gated to permit the passage of the square wave signal into a differentiating circuit. The differentiated output triggers the output pulsing MV so that a square wave driving pulse will be fed out to the recorder driver.

Figure 5:
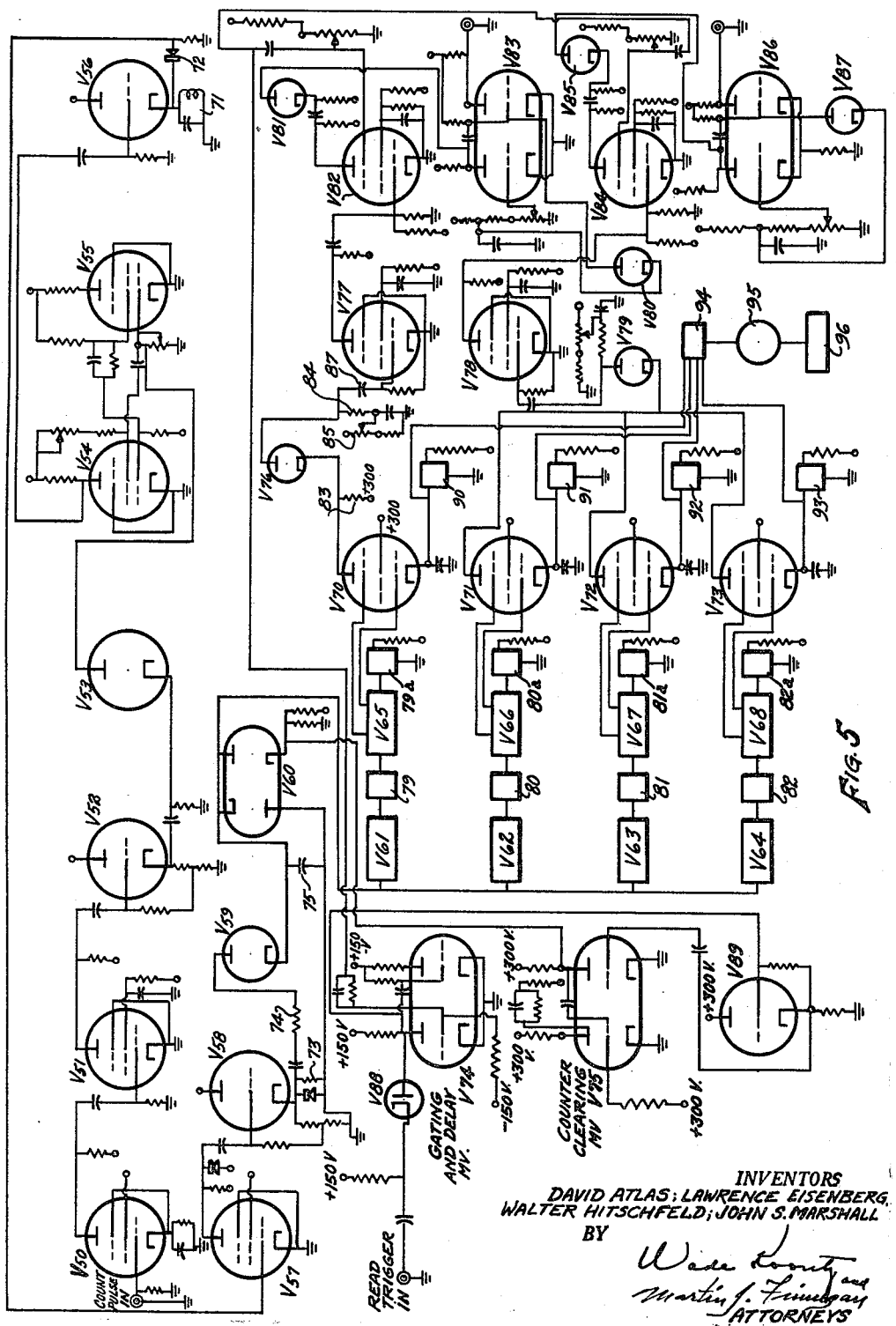
Fig. 5 is a diagram of the electrical connections for the counting components which receive the output of the storage section of the system.

In the counting circuitry, as shown in Fig. 5, $V_{50}$ is a pentode pulse amplifier which receives and amplifies the count pulses with approximately forty db gain. The amplified pulses are applied to $V_{51}$, an amplitude limiter which has an approximately square-shaped pulse output. The pulses are coupled to $V_{54}$ and $V_{55}$, after differentiation by passage through triode $V_{52}$ and rectifier $V_{53}$. $V_{54}$ and $V_{55}$ form an electron-coupled MV with negative output pulses, approximately rectangular in shape, of about 1 ms. duration. These pulses cut off $V_{56}$, the cathode of which goes to ground through a ringing circuit 71. The ringing circuit has a half period of 0.8 ms. The negative half cycle energy passes to the grid of pentode $V_{57}$, and will not be attenuated by crystal 72. The positive half cycles are damped (1 ms. after initiation), by the plate resistance of $V_{56}$ itself which is no longer cut off. The output of $V_{57}$ will be a rectangular pulse, 150 volts in amplitude, since the plate is clamped to the +150 volt line, and 0.8 ms. in duration. This pulse, applied through isolating cathode follower $V_{58}$, is clamped to ground by crystal 73 and applied to the counter. The counter consists of integrating circuit 74 and capacitor 75. $V_{59}$, a blocking diode, prevents the discharge of capacitor 75 back into the source. Diode $V_{59}$ keeps capacitor 75 clamped at zero despite the counter clearing action of $V_{75}$ (the counter clearing MV). At the end of the vertical reading sweep, a negative (flyback) trigger activates $V_{74}$, the gating and delay MV, which discharges capacitor 75 of the counted through the right side of $V_{60}$ after a 40 ms. delay.

The output of the counter is now coupled into four channels. Each of the channels corresponds to one of the desired contour intervals. $V_{61}$, $V_{62}$, $V_{63}$ and $V_{64}$ form the four cathode followers which are tied at the input side to the high potential end of capacitor 75. To avoid unnecessarily complicating this discussion, an analysis will be given of just one of the channels, in particular that of $V_{61}$. The output of $V_{61}$ is clamped by suitable means to a slowly varying noise correction voltage which is applied to adjacent switch 79. This correction is varied with time over the ⅙ sec. read intervals because the receiver gain was attenuated inversely with range by the range compensating rapid attenuator.

The count voltage with noise correction subtracted off is now applied to the grid of $V_{65}$, a difference amplifier. The plates of $V_{65}$ are tied directly to the respective twin control grids of $V_{70}$, which may be a 6AS6. The cathode potential of $V_{70}$ has been set (through switch 90) to an equilibrium potential about 200 volts) which is the plate-to-ground potential of the twin plates of $V_{65}$ when its twin grids are tied together. This potential is measurable through galvanometer 95, when switches 96, 94 and 90 are set to complete such plate-to-ground circuit, by way of connections (not shown) from said $V_{65}$ twin plates to said switch 96. With the first grid at a lower potential than the setting of the second grid, the first plate will be above equilibrium potential and the second plate will be below equilibrium potential. Consequently, the upper grid of $V_{70}$ will be above equilibrium potential and the lower grid will be (in general) sufficiently below equilibrium potential to cut off $V_{70}$. When the first grid of $V_{65}$ is at a higher potential than the setting of the second grid, the first plate will be below and the second plate above equilibrium potential. Consequently, the upper grid of $V_{70}$ will be cut off the plate current of $V_{70}$. With the count voltage at the proper value for which the contour selector 79a is set the two control grids of $V_{70}$ will be at virtually the same potential as the tube cathode, and a voltage drop will be developed across resistor 83.

The combination of diode $V_{76}$, resistors 84 and 85, etc. provides a tolerance control for the discriminator accuracy. The setting of potentiometer 85 determines the minimum voltage drop across 84, the plate load resistor of $V_{70}$, which will result in a signal being coupled through capacitor 87.

Hence, with the count signal voltage between amplitude limits, a negative voltage signal will be coupled to pulse amplifier $V_{77}$ and a positive signal coupled to the grid of $V_{82}$ which is normally cut off at both the grid (pin 1) and suppressor (pin 7). $V_{82}$ is gated to conduct at pin 7, only during the first forty micro-seconds of the flyback interval of the vertical read sweep. This gating is due to a positive rectangular pulse from the plate of $V_{74}$, the gating and delay MV. If, during this gated interval (and only during this gated interval) a count signal is coupled to grid 1 of $V_{82}$, a negative output trigger will be coupled to output pulsing multi-vibrator $V_{83}$. This tube in turn will deliver a rectangular pulse of voltage to the recorder driver.

It should be noted that the amplitude discriminator channel is split into two sub-channels. $V_{61}$, $V_{65}$, and $V_{70}$ comprise the 0 db. channel. The other three amplitude discriminator sections finally lead through to output pulsing multi-vibrator $V_{86}$. $V_{83}$ and $V_{86}$ differ only in the time duration of their output pulses to the recorder driver. The time duration of the output of $V_{83}$ will be approximately twice that of the output of $V_{86}$ so that the 0 db. contour will be darker in color than any of the other contours.

We claim:

1. In an echo signal analyzing system, signal receiver circuitry for detecting the signal content of received energy echoing back from the signal reflecting medium, means for registering only that fraction of each received signal that has a voltage amplitude in excess of an applicable threshold value constituting one of a series of preselected threshold values applied successively to the incoming signal energy, means for storing electronic charges representative of said successively registered excess voltage amplitudes, means for converting said successively registered excess voltage amplitudes into a record conforming to the reflectivity characteristics of said signal reflecting medium, said signal receiver circuitry also incorporating automatic gain control means, and means for attenuating the wave form of the excitation energy delivered to said automatic gain control means, in accordance with variations in the distance traveled by said echo signals.

2. A system for analyzing a train of electrical pulses reflected back from a cloud mass, said system including a bank of amplitude-measuring devices, said bank consisting of $n$ measuring units, each of said units being adjusted to respond only to pulses whose amplitude exceeds a preassigned threshold level, which level differs for each of said units, and means for causing the first of said units to receive the first pulse of the pulse train, and every $n$th pulse thereafter, said means also operating to cause the second of said units to receive the second pulse of the pulse train, and every $n$th pulse thereafter.

3. Means for determining the reflectivity of particles in a cloud mass overlying a fixed ground station, comprising signal recording means at said ground station, said signal recording means including a series of contour lines on said signal recording means at intervals spaced, one from another, to represent progressively higher signal levels indicative of progressively heavier moisture concentration in said cloud mass, means for developing voltage values proportional to the strength of echo signals reflected vertically downward from said cloud mass, and means for applying a marking adjacent an individual contour line whenever one of said voltage values coincides with the signal level associated with said contour lines.

4. Means for determining the density of moisture in a storm cloud overlying a fixed ground station comprising, in combination, means for transmitting a train of pulses from said station in a vertical direction, means for receiving the return echo pulses reflected by the moisture content of said storm cloud, means for storing said pulses in a predetermined number of sequential positions, means for applying the stored pulse charges successively to a voltage-matching (counting) operation, to determine whether their amplitudes coincide with any one of a group of standard voltage values, representative of progressively different cloud reflectivity coefficients, and means for recording each occurrence of the voltage-matching condition.

References Cited in the file of this patent

UNITED STATES PATENTS

| | | |
|---|---|---|
| 2,492,120 | Smith | Dec. 20, 1949 |
| 2,639,209 | Gamarekian | May 19, 1953 |
| 2,688,441 | Merrill et al. | Sept. 7, 1954 |
| 2,778,949 | Borkowski et al. | Jan. 22, 1957 |
| 2,779,869 | Gerks | Jan. 29, 1957 |